(12) United States Patent  
Hung

(10) Patent No.: US 10,281,294 B2  
(45) Date of Patent: May 7, 2019

(54) NAVIGATION SYSTEM AND NAVIGATION METHOD

(71) Applicants: Inventec (Pudong) Technology Corporation, Shanghai (CN); INVENTEC CORPORATION, Taipei (TW)

(72) Inventor: Hsu-Tsung Hung, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 64 days.

(21) Appl. No.: 15/479,275

(22) Filed: Apr. 4, 2017

(65) Prior Publication Data

US 2018/0135996 A1    May 17, 2018

(30) Foreign Application Priority Data

Nov. 11, 2016 (CN) .......................... 2016 1 0995587

(51) Int. Cl.
| | |
|---|---|
| *G01C 21/36* | (2006.01) |
| *H04L 29/08* | (2006.01) |
| *G06K 9/32* | (2006.01) |
| *G06K 9/62* | (2006.01) |
| *G06T 7/73* | (2017.01) |

(52) U.S. Cl.
CPC ....... *G01C 21/365* (2013.01); *G01C 21/3602* (2013.01); *G06K 9/3241* (2013.01); *G06K 9/6215* (2013.01); *G06T 7/74* (2017.01); *H04L 67/1097* (2013.01)

(58) Field of Classification Search
CPC .......................... G01C 21/365; G01C 21/3407
See application file for complete search history.

(56) References Cited

U.S. PATENT DOCUMENTS

| | | | | |
|---|---|---|---|---|
| 2009/0265096 A1* | 10/2009 | Haatainen | .......... | G01C 21/3407 701/533 |
| 2012/0065814 A1* | 3/2012 | Seok | ...................... | B60K 35/00 701/2 |
| 2012/0148091 A1* | 6/2012 | Kansal | ................... | G01C 21/20 382/100 |
| 2016/0063762 A1* | 3/2016 | Heuvel | .................... | G06F 3/011 345/633 |
| 2017/0200068 A1* | 7/2017 | Cohen | ................ | G06K 9/00979 |

* cited by examiner

*Primary Examiner* — William C Vaughn, Jr.
*Assistant Examiner* — Jerry T Jean Baptiste
(74) *Attorney, Agent, or Firm* — CKC & Partners Co., LLC

(57) ABSTRACT

The present disclosure provides a navigation system that includes an electronic device and a cloud server. The electronic device is configured to capture an environmental image, and to transmit the environmental image and a target information. The cloud server is configured to store several default patterns, and each of the default patterns corresponds to a default coordinate. The cloud server analyzes a pattern image of the environmental image according to the default patterns to calculate a coordinate of the electronic device, so as to execute navigation according to the coordinate of the electronic device and the target information.

4 Claims, 3 Drawing Sheets

100

NAVIGATION SYSTEM AND NAVIGATION METHOD

RELATED APPLICATIONS

This application claims priority to Chinese Application Serial Number 201610995587.3, filed Nov. 11, 2016, which is herein incorporated by reference.

BACKGROUND

Field of Invention

The present disclosure relates to a planning system and a planning method. More particularly, the present disclosure relates to a navigation system and a navigation method.

Description of Related Art

With the rapid development of augmented reality (AR) technology, electronic devices using the augmented reality technology are widely applied in human life and playing an increasingly important role. For example, electronic devices using the augmented reality technology are widely applied to fields, such as education, product marketing, and life entertainment, etc. However, current electronic devices using the augmented reality technology are still rarely applied to the navigation are to assist users in route planning and navigation. Although route planning and navigation can be performed by directly executing now existing navigation programs on the electronic devices, the operation interfaces of the electronic devices are not intuitive for users because the conventional navigation programs are not specifically designed for the applications of augmented reality. As a result, the quality of user experience is significantly reduced.

Therefore, how to effectively optimize the operation interfaces of the electronic devices using the augmented reality and enhance the quality of user experience when designing the navigation system and the navigation method is a major challenge.

SUMMARY

A navigation system is provided. The navigation system includes an electronic device and a cloud server. The electronic device is configured to capture an environmental image, and to transmit the environmental image and a target information. The cloud server is configured to store several default patterns, and each of the default patterns corresponds to a default coordinate. The cloud server analyzes a pattern image of the environmental image according to the default patterns to calculate a coordinate of the electronic device, so as to execute navigation according to the coordinate of the electronic device and the target information.

The present disclosure provides a navigation method applied to a navigation system. The navigation system includes an electronic device and a cloud server. The navigation method includes steps as follows: capturing an environmental image and transmitting the environmental image and a target information to the cloud server via the electronic device; analyzing a pattern image of the environmental image according to several default patterns via the cloud server, so as to calculate a coordinate of the electronic device, wherein each of the default patterns corresponds to a default coordinate; and executing navigation according to the coordinate of the electronic device and the target information via the cloud server.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Figure 1:
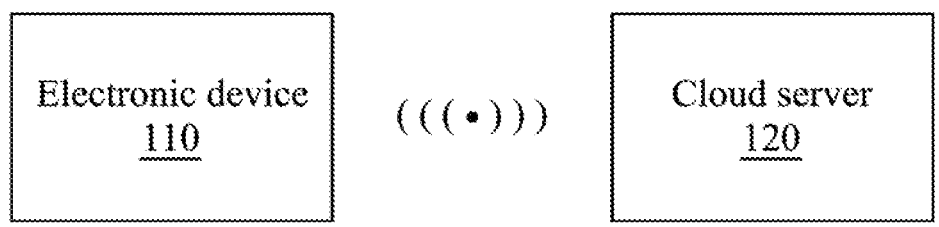
FIG. 1 depicts a block schematic diagram of a navigation system according to embodiments of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. Description of the operation does not intend to limit the operation sequence. Any structures resulting from recombination of devices with equivalent effects are within the scope of the present disclosure. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

In the following description and in the claims, the terms "comprising", "including", "having", "containing", "involving" and the like are used in an open-ended fashion and thus should be interpreted to mean "include, but not limited to."

In this document, the term "coupled" may also be termed"electrically coupled," and the term "connected" may be termed "electrically connected." "Connected" or "coupled" may also be used to indicate that two or more elements cooperate or interact with each other.

FIG. 1 depicts a schematic diagram of a structure of a navigation system 100 according to embodiments of the present disclosure. As shown in FIG. 1, the navigation system 100 includes an electronic device 110 and a c loud serve 120. The electronic device 110 is configured to capture an environmental image, and to transmit the environmental image and a target information to the cloud server 120. The cloud server 120 is configured to store several default patterns, and each of the default patterns corresponds to a default coordinate. The cloud server 120 analyzes a pattern image of the environmental image according to the default patterns, so as to calculate a coordinate of the electronic device 110. Then, the cloud server 120 executes navigation according to the coordinate of the electronic device 110 and the target information.

For example, the electronic device 100 may be a smart device, a tablet computer, or any device having an image capturing function and a computation function. In addition, the target information may be a location name input by a user via the electronic device 110. After the electronic device 100 transmits the environmental image and the target information (such as the location name) to the cloud server 120, the cloud server 120 can generate a coordinate correspondingly according to the target information (such as a coordinate corresponds to the location name), so that the cloud server 120 executes navigation for the user according to the coordinate of the electronic device 110 and the coordinate corresponding to the target information.

Figure 2A:
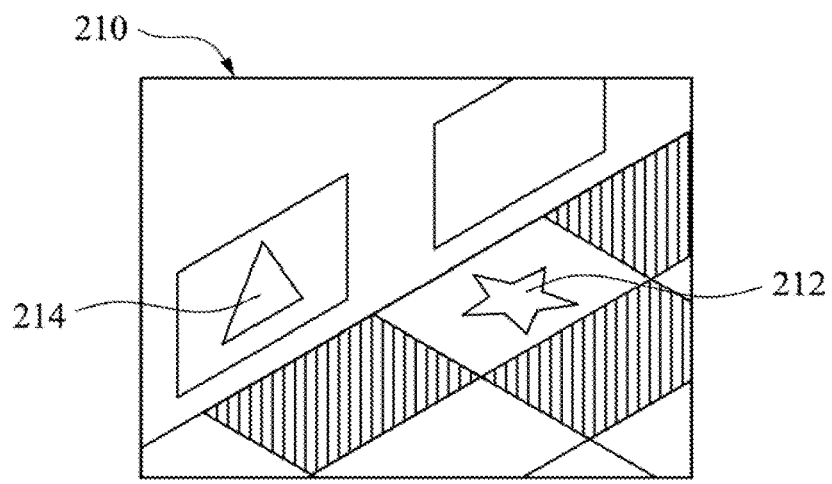
FIG. 2A depicts a schematic diagram of an environmental image captured by an electronic device according to embodiments of the present disclosure.
Figure 2B:
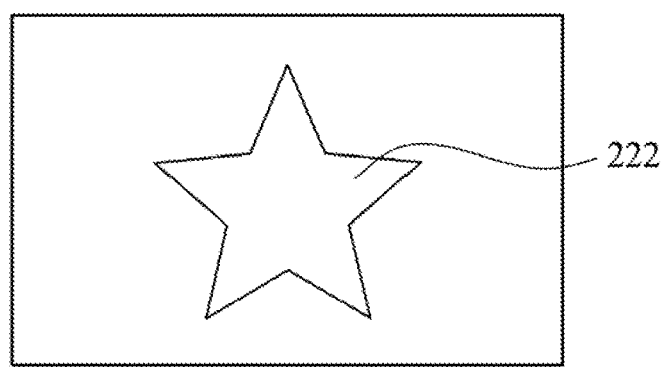
FIG. 2B and FIG. 2C depict schematic diagrams of reference patterns stored in a cloud server according to embodiments of the present disclosure.
Figure 2C:
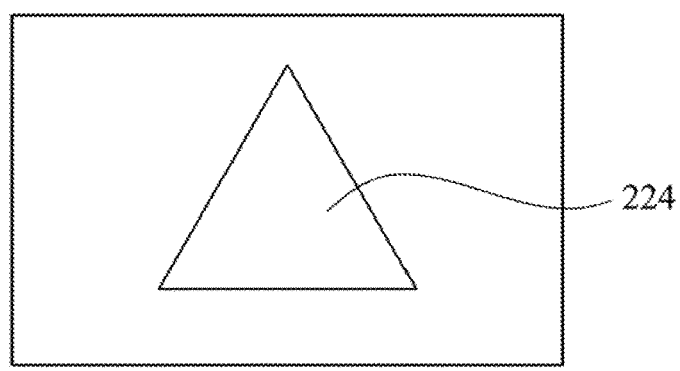

In one embodiment, the cloud server 120 is configured to compare the pattern image with the default patterns, so as to determine whether the pattern image is the same as a reference pattern of the default patterns. For example, the pattern image may be disposed on a floor, a wall, a pillar, or any main object having a fixed position. A description is provided with reference to FIG. 2A, FIG. 2B, and FIG. 2C. FIG. 2A depicts a schematic diagram of an environmental image 210 captured by the electronic device 110 according to embodiments of the present disclosure, and FIG. 2B and FIG. 2C depict schematic diagrams of reference patterns stored in the cloud server 120 according to embodiments of the present disclosure. As shown in FIG. 2A, the environmental image 210 includes a first pattern image 212 and a second pattern image 214, and the first patter image 212 is disposed on the floor and the second pattern image 214 is disposed on the wall. In addition to that, as shown in FIG. 2A, FIG. 2B, and FIG. 2C, the first pattern image 212 and a first reference pattern 222 are both in a star shape, and the second pattern image 214 and a second reference pattern 224 are both in a triangular shape. For example, the first reference pattern 222 and the second reference pattern 224 may respectively be different default patterns, and both the first reference pattern 222 and the second reference pattern 224 are stored in the cloud server 120.

In another embodiment, when the cloud server 120 determines that the pattern image is the same as the reference pattern of the default patterns, the cloud server 120 calculates the coordinate of the electronic device 110 according to the default coordinate corresponding to the reference pattern. A description is provided with reference to FIG. 2A, FIG. 2B, and FIG. 2C. For example, the cloud server 120 compares pattern images (such as the first pattern image 212 and the second pattern image 214) with the default patterns and determines that the pattern images are the same as reference patterns (such as the first reference pattern 222 and the second reference pattern 224) in the default patterns. Since each of the default patterns corresponds to the default coordinate, the cloud server 120 can calculate the coordinate of the electronic device 110 simultaneously according to default coordinates corresponding to the first reference pattern 222 and the second reference pattern 224.

In still another embodiment, when the cloud server 120 determines that the pattern image is the same as the reference pattern of the default patterns, the cloud server 120 calculates the coordinate of the electronic device 110 according to a size and an angle of the reference pattern in the environmental image. A description is provided with FIG. 2A and FIG. 2B. For example, the first pattern image 212 and the first reference pattern 222 are both in the star shape, but sizes and angles of the first pattern image 212 and the first reference pattern 222 are different from each other. Hence, the cloud server 120 can calculate the coordinate of the electronic device 110 according to the size and the angle of the first reference pattern 222 in the environmental image 210. In other words, the cloud server 120 can compute a relative position of the electronic device 110 with respect to the first pattern image 212 based on differences (such as size and angle) between the first pattern image 212 and the first reference pattern 222, so as to calculate the coordinate of the electronic device 110.

Similarly, a description is provided with reference to FIG. 2A and FIG. 2C. The second pattern image 214 and the second reference pattern 224 are both in the triangular shape, but sizes and angles of the second pattern image 214 and the second reference pattern 224 are different from each other. Hence, the cloud server 120 can calculate the coordinate of the electronic device 110 according to a size and an angle of the second reference pattern 224 in the environmental image 210 (as shown in the above embodiment). In the present embodiment, the cloud server 120 can calculate the coordinate of the electronic device 110 simultaneously according to the sizes and the angles of the first reference, pattern 222 and the second reference pattern 224 in the environmental image 210.

In one embodiment, the electronic device 110 is configured to transmit the environmental image with high resolution and the target information to the cloud server 120, and to continuously transmit another environmental image with low resolution to the cloud server 120 according to operations of the cloud server 120. For example, the electronic device 110 transmits the high-resolution environmental image and the target information to the cloud server 120 first. In this manner, the pattern image of the environmental image can be presented in a high-resolution form to facilitate the cloud server 120 to analyze the pattern image of the environmental image, so as to calculate the coordinate of the electronic device 110. When the cloud server 120 executes navigation for the user according to the coordinate of the electronic device 110 and the target information and the user moves according to the navigation of the cloud server 120, the electronic device 110 can change to transmit the another environmental image with low resolution to the cloud server 120 according to a movement of the user. As a result, a transmission speed of the environmental image can be improved to facilitate the cloud server 120 to update the coordinate of the electronic device 110 (because the user moves according to the navigation of the cloud server 120), so as to continuously execute navigation subsequently.

In one embodiment, the navigation system 100 can be combined with augmented reality technology to provide the user with route planning and navigation. For example, the navigation system 100 can present a virtual sign (such as a directional arrow) through a display device of the electronic device 110, and the virtual sign is configured to guide the user, so as to continually provide the user with virtual navigation.

Figure 3:
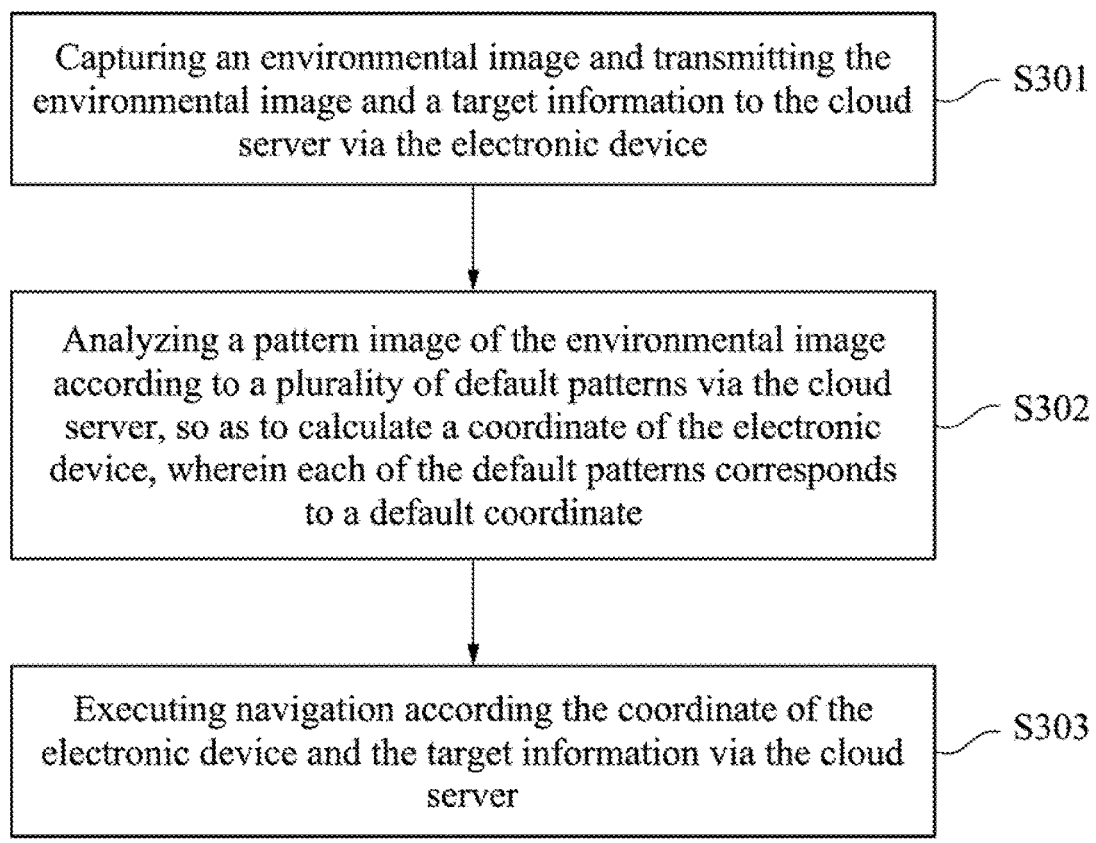
FIG. 3 depicts a flow chart of a navigation method according to embodiments of the present disclosure.

FIG. 3 depicts a flowchart of a navigation method 300 according to embodiments of the present disclosure. In one embodiment, the navigation method 300 may be applied to the above navigation system 100, but the present disclosure is not limited in this regard. In order to facilitate the understanding of the navigation method 300, the navigation system 100 will be described in the following to serve as an exemplary subject for implementing the navigation method 300. As shown in FIG. 3, the navigation method 300 includes steps as follows:

S301: capturing an environmental image and transmit the environmental image and a target information to the cloud server 120 via the electronic device 110;

S302; analyzing a pattern image of the environmental image according to a plurality of default patterns via the cloud server 120, so as to calculate a coordinate of the electronic device 110, wherein each of the default patterns corresponds to a default coordinate; and S303: executing navigation according the coordinate of the electronic device 110 and the target information via the cloud server 120.

For example, the target information may be a name of a location that a user intends to go to. After the target information (such as the name of the location) transmitted to the cloud server 120 via the electronic device 110, a coordinate can be generated correspondingly according to the target information via the cloud server 120, so as to perform navigation subsequently.

In one embodiment, a description is provided with reference to step S302. The navigation method 300 can be performed by the cloud server 120 to compare the pattern image with the default patterns, so as to determine whether the pattern image is the same as a reference pattern of the default patterns. For example, the pattern image may be disposed on a floor, a wall, a pillar, or any main object having a fixed position.

In another embodiment, a description is provided with reference to step S302. When the pattern image is determined to be the same as the reference pattern of the default patterns, the navigation method 300 can be performed by the cloud server 120 to calculate the coordinate of the electronic device 110 according to the default coordinate corresponding to the reference pattern. For example, since each of the default patterns corresponds to the default coordinate, the cloud server 120 can calculate the coordinate of the electronic device 110 according to the default coordinate corresponding to the reference pattern.

In still another embodiment, a description is provided with reference to step S302. When the pattern image is determined to be the same as the reference pattern of the default patterns, the navigation method 300 can be performed by the cloud server 120 to calculate the coordinate of the electronic device 110 according to a size and an angle of the reference pattern in the environmental image. For example, the cloud server 120 can compute a relative position of the electronic device 110 with respect to the pattern image based on differences (such as size and angle) between the pattern image and the reference pattern, so as to calculate the coordinate of the electronic device 110.

In one embodiment, a description is provided with reference to step S301. The navigation method 300 can be performed by the electronic device 110 to transmit the environmental image with high resolution and the target information to the cloud server 120. When the cloud server 120 executes navigation according to the coordinate of the electronic device 110 and the target information, the navigation method 300 may further be performed by the electronic device 110 to continuously transmit another environmental image with low resolution to the cloud server 120. For example, the electronic device 110 transmits the high-resolution environmental image and the target information to the cloud server 120 first. In this manner, the pattern image of the environmental image can be presented in a high-resolution form to facilitate the cloud server 120 to analyze the pattern image of the environmental image, so as to calculate the coordinate of the electronic device 110. When the cloud server 120 execute navigation fore the user according to the coordinate of the electronic device 110 and the target information and the user moves according to the navigation of the cloud server 120, the electronic device 110 can change to transmit the another environmental image with low resolution to the cloud server 120 according to a movement of the user. As a result, a transmission speed of the environmental image can be improved to facilitate the cloud server 120 to update the coordinate of the electronic device 110 (because the user moves according to the navigation of the cloud server 120), so as to continuously execute navigation subsequently.

In one embodiment, the navigation method 300 can be combined with augmented reality technology to provide the with route planning and navigation. For example, the navigation method 300 can be performed by the electronic device 110 to present a virtual sign (such as a directional arrow) through a display device of the electronic device 110, and the virtual sign is configured to guide the user, so a to continually provide the user with virtual navigation.

According to the embodiments of the present disclosure, the present disclosure navigation system and navigation method analyze the pattern image of the environmental image according to the default patterns, so as to calculate the coordinate of the electronic device, and then provide the user with route planning and navigation according to the coordinate of the electronic device thus calculated and the target information. In addition, the navigation system and navigation method according to the present disclosure can be combined with augmented reality technology (for example, capture the environmental image, plan routes and execute navigation through an operation interface using augmented reality). Hence, the operation interfaces of the electronic devices using the augmented reality can be optimized to effectively enhance the quality of user experience.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A navigation system comprising:
an electronic device, comprising an image capturing circuit configured to capture an environmental image, and a communication circuit configured to transmit the environmental image and a target information; and
a cloud server, configured to receive the environment image from the electronic device and store a plurality of default patterns, and each of the default patterns corresponding to a default coordinate, wherein the cloud server analyzes a pattern image of the environmental image according to the default patterns to calculate a coordinate of the electronic device, so as to execute navigation according to the coordinate of the electronic device and the target information;

wherein the cloud server is configured to compare the pattern image with the default patterns, so as to determine whether the pattern image is the same as a reference pattern of the default patterns;

wherein when the cloud server determines that the pattern image is the same as the reference pattern of the default patterns, the cloud server calculates the coordinate of the electronic device according to the default coordinate corresponding to the reference pattern, and calculates the coordinate of the electronic device according to a size and an angle of the reference pattern in the environmental image.

2. The navigation system of claim 1, wherein the electronic device transmits the environmental image with high resolution and the target information to the cloud server, and continuously transmits another environmental image with low resolution to the cloud server according to operations of the cloud server.

3. A navigation method, applied to a navigation system, wherein the navigation system comprises an electronic device and a cloud server, and the navigation method comprises:

capturing an environmental image and transmitting the environmental image and a target information to the cloud server via the electronic device;

analyzing a pattern image of the environmental image according to a plurality of default patterns to compare the pattern image with the default patterns via the cloud server, so as to determine whether the pattern image is the same as a reference pattern of the default patterns and to calculate a coordinate of the electronic device, wherein each of the default patterns corresponds to a default coordinate; and executing navigation according the coordinate of the electronic device and the target information via the cloud server;

wherein when the pattern image is determined to be the same as the reference pattern of the default patterns, the cloud server calculates the coordinate of the electronic device according to the default coordinate corresponding to the reference pattern;

wherein when the pattern image is determined to be the same as the reference pattern of the default patterns, the cloud server calculates the coordinate of the electronic device according to a size and an angle of the reference pattern in the environmental image.

4. The navigation method of claim 3, further comprising:

transmitting the environmental image with high resolution and the target information to the cloud server via the electronic device; and when executing the navigation according to the coordinate of the electronic device and the target information via the cloud serve, continuously transmitting another environmental image with low resolution to the cloud server via the electronic device.

* * * * *